Dec. 3, 1929.   H. HOISINGTON   1,738,474
GUN CARRIAGE
Filed Dec. 17, 1927
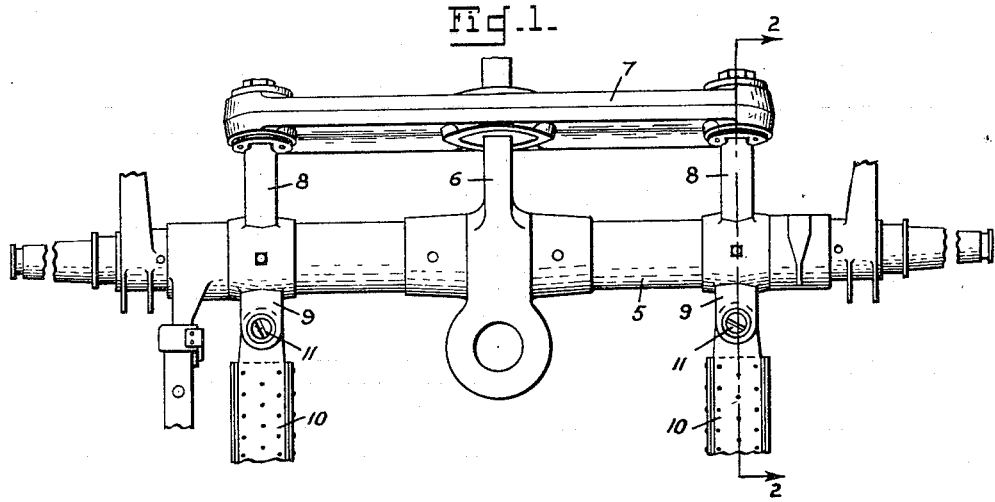
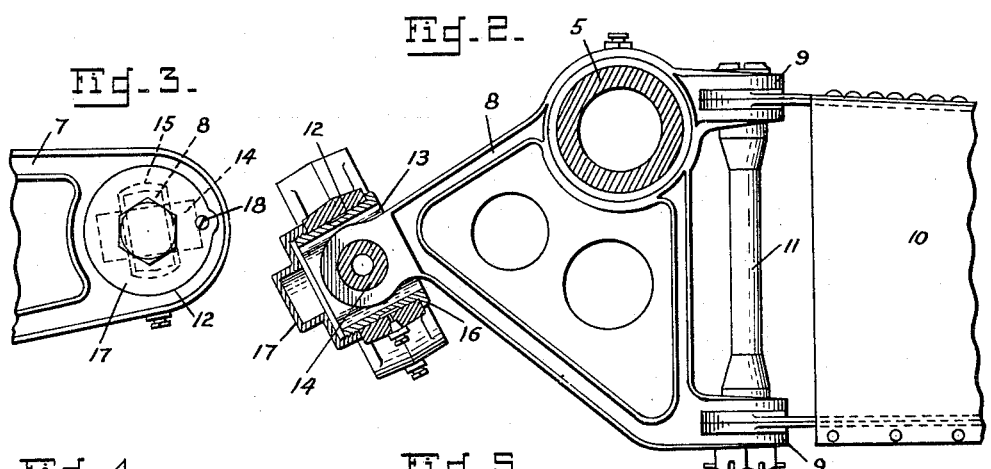
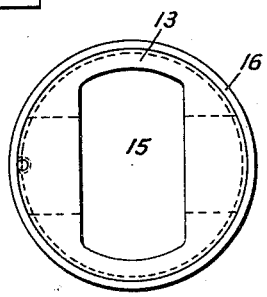
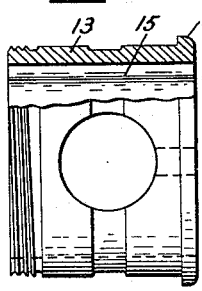
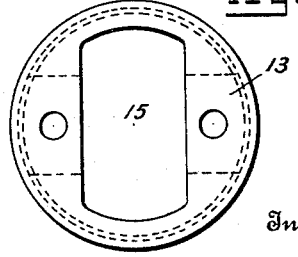
Inventor
Harry Hoisington
By W. N. Roach
Attorney Patented Dec. 3, 1929

1,738,474

UNITED STATES PATENT OFFICE

HARRY HOISINGTON, OF DAVENPORT, IOWA

GUN CARRIAGE

Application filed December 17, 1927. Serial No. 240,881.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to a gun carriage and more particularly it has reference to the mounting of an equalizing device which is provided to preserve the stability of the carriage when its wheels or trails are on uneven ground.

In those equalizing devices for gun carriages having a split trail in which the centrally pivoted cross bar is trunnioned in extensions of the trails as illustrated in Patents Nos. 1,476,435 and 1,606,116, the arrangement of assembly is such that in removing the cross bar it is necessary to remove the wheels and slide the trail extensions along the axle.

With a view to correcting this defect the present invention contemplates a mounting which will permit assembly and disassembly of the equalizer cross bar without disturbing the trails and trail extensions.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the drawings, wherein:

Fig. 1 is a plan view of a gun carriage axle equipped with an equalizing device;

Fig. 2 is a sectional view on the line 2—2 of Fig. 1;

Fig. 3 is a fragmentary view in front elevation of an end of the equalizing device;

Figs. 4, 5 and 6 are detail views of the bushing member.

Referring to the drawings by numerals of reference:

There is shown a gun carriage axle 5 provided centrally with a forwardly extending fulcrum 6 on which is mounted an equalizer cross bar 7.

The cross bar 7 is to be connected to arms 8 revolubly mounted on the axle and having apertured ears 9 for attachment of the trail members 10 by means of the hinge pin 11. In order that the bar may be coupled with the trail arms 8 in place, its opposite ends are formed with annular bearings 12 each of which is receivable on a bushing 13 which is trunnioned on the forward extremity of the arm 8 by means of the pin 14. The arm 8 extends within an opening 15 in the bushing and is spaced therefrom to permit pivoted movement of the bushing.

The equalizer bar 7 is held in place against the rear flanges 16 of the bushings by means of nuts 17 which are threaded on the forward ends of the bushings. After assembly a screw 18 is employed to prevent unthreading of the nut.

I claim:

In combination with an axle, arms revolubly mounted on the axle, trails attached to said arms, a flanged bushing trunnioned on the forward extremity of each trail arm, an equalizer cross bar fulcrumed centrally on the axle and formed with an annular bearing on each end for mounting on the bushings, and a nut threaded to each bushing for retaining the cross bar in place.

HARRY HOISINGTON.